(12) United States Patent
Kraus et al.

(10) Patent No.: US 12,516,103 B2
(45) Date of Patent: Jan. 6, 2026

(54) CELL CULTURE METHOD

(71) Applicant: AMGEN INC., Thousand Oaks, CA (US)

(72) Inventors: Eliyahu Kraus, Thousand Oaks, CA (US); Venkatesh Natarajan, Thousand Oaks, CA (US); Ritsdeliz Perez Rodriguez, Thousand Oaks, CA (US); Omar Cruz Nieves, Thousand Oaks, CA (US)

(73) Assignee: AMGEN INC., Thousand Oaks, CA (US)

( * ) Notice: Subject to any disclaimer, the term of this patent is extended or adjusted under 35 U.S.C. 154(b) by 347 days.

(21) Appl. No.: 18/268,639

(22) PCT Filed: Dec. 21, 2021

(86) PCT No.: PCT/US2021/064616
§ 371 (c)(1),
(2) Date: Jun. 21, 2023

(87) PCT Pub. No.: WO2022/140389
PCT Pub. Date: Jun. 30, 2022

(65) Prior Publication Data
US 2024/0083972 A1 Mar. 14, 2024

Related U.S. Application Data (60) Provisional application No. 63/129,349, filed on Dec. 22, 2020.

(51) Int. Cl.
| | | |
|---|---|---|
| C07K 14/715 | (2006.01) | |
| A61K 38/00 | (2006.01) | |
| C12N 5/00 | (2006.01) | |
| C12N 5/071 | (2010.01) | |

(52) U.S. Cl.
CPC ........ *C07K 14/7151* (2013.01); *C12N 5/0018* (2013.01); *C12N 5/0682* (2013.01); *A61K 38/00* (2013.01); *C12N 2500/12* (2013.01); *C12N 2500/32* (2013.01); *C12N 2500/34* (2013.01); *C12N 2500/46* (2013.01); *C12N 2501/998* (2013.01)

(58) Field of Classification Search
None
See application file for complete search history.

(56) References Cited

U.S. PATENT DOCUMENTS

| | | |
|---|---|---|
| 5,122,469 A | 6/1992 | Mather et al. |
| 5,633,162 A | 5/1997 | Keen et al. |
| 6,309,841 B1 | 10/2001 | Morris et al. |
| 6,413,744 B1 | 7/2002 | Morris et al. |
| 6,544,424 B1 | 4/2003 | Shevitz |
| 6,632,637 B1 | 10/2003 | Mcgrew |
| 6,872,549 B2 | 3/2005 | Van et al. |
| 6,890,736 B1 | 5/2005 | Reddy et al. |
| 6,897,040 B2 | 5/2005 | Morris et al. |
| 6,924,124 B1 | 8/2005 | Singh |
| 6,974,681 B1 | 12/2005 | Mcgrew |
| 7,067,279 B1 | 6/2006 | Follstad et al. |
| 7,083,948 B1 | 8/2006 | Sassenfeld et al. |
| 7,091,004 B1 | 8/2006 | Morris et al. |
| 7,122,641 B2 | 10/2006 | Vedantham et al. |
| 7,157,557 B2 | 1/2007 | Sassenfeld et al. |
| 7,276,477 B2 | 10/2007 | Osslund et al. |
| 7,294,481 B1 | 11/2007 | Fung |
| 7,300,773 B2 | 11/2007 | Drapeau et al. |
| 7,384,765 B1 | 6/2008 | Follstad et al. |
| 7,427,659 B2 | 9/2008 | Shukla et al. |
| 7,452,695 B2 | 11/2008 | Van et al. |
| 7,476,722 B2 | 1/2009 | Vedantham et al. |
| 7,544,784 B2 | 6/2009 | Sassenfeld et al. |
| 7,645,609 B2 | 1/2010 | Follstad |
| 7,648,702 B2 | 1/2010 | Gombotz et al. |
| 7,723,490 B2 | 5/2010 | Treuheit et al. |
| 7,781,395 B2 | 8/2010 | Senczuk et al. |
| 7,829,309 B1 | 11/2010 | Follstad et al. |
| 7,834,162 B2 | 11/2010 | Zhou |
| 7,888,101 B2 | 2/2011 | Crowell |
| 7,915,225 B2 | 3/2011 | Finck |
| 7,956,160 B2 | 6/2011 | Krishnan et al. |
| 8,052,645 B2 | 11/2011 | Slate et al. |
| 8,053,236 B2 | 11/2011 | Morris et al. |

(Continued)

FOREIGN PATENT DOCUMENTS

| | | |
|---|---|---|
| WO | 2014/089393 A1 | 6/2014 |
| WO | 2016/033496 A1 | 3/2016 |

(Continued)

OTHER PUBLICATIONS

Brady et al., Molecular mass analysis of antibodies by on-line SEC-MS, J. Am. Soc. Mass Spectrom, 19(4): 502-509 (2008).

(Continued)

*Primary Examiner* — Blaine Lankford
(74) *Attorney, Agent, or Firm* — MARSHALL, GERSTEIN & BORUN LLP (57) ABSTRACT

The disclosure provides a method of producing etanercept from Chinese hamster ovary cells (CHO), the method comprising running an N−1 bioreactor system using a recirculating tangential flow filtration (RTF) or alternating tangential flow filtration (ATF) cell retention device under conditions that maintain a cell aggregate size of at least 20 μm, before running an N production bioreactor.

13 Claims, 2 Drawing Sheets

Specification includes a Sequence Listing.

(56) References Cited

U.S. PATENT DOCUMENTS

| | | |
|---|---|---|
| 8,063,182 B1 | 11/2011 | Brockhaus et al. |
| 8,119,604 B2 | 2/2012 | Gombotz et al. |
| 8,119,605 B2 | 2/2012 | Finck |
| 8,163,522 B1 | 4/2012 | Brockhaus et al. |
| 8,177,749 B2 | 5/2012 | Slate et al. |
| 8,217,153 B2 | 7/2012 | Zhou |
| 8,247,210 B2 | 8/2012 | Crowell |
| 8,273,707 B2 | 9/2012 | Senczuk et al. |
| 8,410,060 B2 | 4/2013 | Finck |
| 8,460,896 B2 | 6/2013 | Crowell |
| 8,680,248 B2 | 3/2014 | Crowell |
| 8,722,631 B2 | 5/2014 | Finck |
| 8,828,947 B2 | 9/2014 | Gombotz et al. |
| 8,920,374 B2 | 12/2014 | Bokelman et al. |
| 9,518,111 B2 | 12/2016 | Gombotz et al. |
| 2013/0303732 A1 | 11/2013 | Hewig et al. |
| 2014/0296489 A1* | 10/2014 | Puchacz .......... C07K 19/00 435/69.6 |
| 2020/0323958 A1 | 10/2020 | Kraus |

FOREIGN PATENT DOCUMENTS

| | | |
|---|---|---|
| WO | 2016/033507 A2 | 3/2016 |
| WO | 2020/238918 A1 | 12/2020 |

OTHER PUBLICATIONS

Brasel et al., Hematologic effects of flt3 ligand in vivo in mice, Blood, 88(6):2004-2012 (1996).

Chu et al., Industrial choices for protein production by large-scale cell culture, Current Opin. Biotechnol., 12(2):180-87 (2001).

Clincke et al., Very high density of CHO cells in perfusion by ATF or TFF in WAVE bioreactor™ ;. Part I. Effect of the cell density on the process, Biotechnol. Prog., 29(3):754-67 (2013).

Furey, Scale-up of a cell culture perfusion process-A low-shear filtration system that inhibits filter-membrane fouling, Genetic Engineering News, 22(7):62-63 (2002).

Han et al., Cultivation of Recombinant Chinese hamster ovary cells grown as suspended aggregates in stirred vessels, J. Biosci. Bioeng., 102(5):430-5 (2006).

International Application No. PCT/US2021/064616, International Search Report and Written Opinion, mailed May 13, 2022.

Kaufman et al., Synthesis, processing, and secretion of recombinant human factor VIII expressed in mammalian cells, J. Biol. Chem., 263(13):6352-6362 (1988).

Kaufman, Selection and coamplification of heterologous genes in mammalian cells, Meth. Enzymol., 185:537-566 (1990).

Mckinnon et al., Expression, purification and characterization of secreted recombinant human insulin-like growth factor-I (IGF-I) and the potent variant des(1-3) IGF-I in Chinese hamster ovary cells, J. Mol. Endocrinol., 6(3):231-239 (1991).

Urlaub et al., Isolation of Chinese hamster cell mutants deficient in dihydrofolate reductase activity, Proc. Natl. Acad. Sci. U.S.A., 77(7):4216-4220 (1980).

Wood et al., High level synthesis of immunoglobulins in Chinese hamster ovary cells. , J. Immunol., 145(9):3011-3016 (1990).

* cited by examiner

FIGURE 2

Leu Pro Ala Gln Val Ala Phe Thr Pro Tyr Ala Pro Glu Pro Gly Ser Thr Cys Arg
Leu Arg Glu Tyr Tyr Asp Gln Thr Ala Gln Met Cys Cys Ser Lys Cys Ser Pro Gly
Gln His Ala Lys Val Phe Cys Thr Lys Thr Ser Asp Thr Val Cys Asp Ser Cys Glu
Asp Ser Thr Tyr Thr Gln Leu Trp Asn Trp Val Pro Glu Cys Leu Ser Cys Gly Ser
Arg Cys Ser Ser Asp Gln Val Glu Thr Gln Ala Cys Thr Arg Glu Gln Asn Arg Ile
Cys Thr Cys Arg Pro Gly Trp Tyr Cys Ala Leu Ser Lys Gln Glu Gly Cys
Arg Leu Cys Ala Pro Leu Arg Lys Cys Arg Pro Gly Phe Gly Val Ala Arg Pro
Gly Thr Glu Thr Ser Asp Val Val Cys Lys Pro Cys Ala Pro Gly Thr Phe Ser Asn
Thr Thr Ser Ser Thr Asp Ile Cys Arg Pro His Gln Ile Cys Asn Val Val Ala Ile
Pro Gly Asn Ala Ser Met Asp Ala Val Cys Thr Ser Thr Ser Pro Thr Arg Ser
Met Ala Pro Gly Ala Val His Leu Pro Gln Pro Val Ser Thr Arg Ser Gln His Thr
Gln Pro Thr Pro Glu Pro Ser Thr Ala Pro Ser Thr Ser Phe Leu Leu Pro Met
Gly Pro Ser Pro Pro Ala Glu Gly Ser Thr Gly Asp Glu Pro Lys Ser Cys Asp Lys
Thr His Thr Cys Pro Pro Cys Pro Ala Pro Glu Leu Leu Gly Gly Pro Ser Val Phe
Leu Phe Pro Pro Lys Pro Lys Asp Thr Leu Met Ile Ser Arg Thr Pro Glu Val Thr
Cys Val Val Val Asp Val Ser His Glu Asp Pro Glu Val Lys Phe Asn Trp Tyr Val
Asp Gly Val Glu Val His Asn Ala Lys Thr Lys Pro Arg Glu Glu Gln Tyr Asn Ser
Thr Tyr Arg Val Val Ser Val Leu Thr Val Leu His Gln Asp Trp Leu Asn Gly
Lys Glu Tyr Lys Cys Lys Val Ser Asn Lys Ala Leu Pro Ala Pro Ile Glu Lys Thr
Ile Ser Lys Ala Lys Gly Gln Pro Arg Glu Pro Gln Val Tyr Thr Leu Pro Pro Ser
Arg Glu Glu Met Thr Lys Asn Gln Val Ser Leu Thr Cys Leu Val Lys Gly Phe
Tyr Pro Ser Asp Ile Ala Val Glu Trp Glu Ser Asn Gly Gln Pro Glu Asn Asn Tyr
Lys Thr Thr Pro Pro Val Leu Asp Ser Asp Gly Ser Phe Phe Leu Tyr Ser Lys Leu
Thr Val Asp Lys Ser Arg Trp Gln Gln Gly Asn Val Phe Ser Cys Ser Val Met
His Glu Ala Leu His Asn His Tyr Thr Gln Lys Ser Leu Ser Leu Ser Pro Gly Lys
(SEQ ID NO: 1)

SEQUENCE LISTING

```
<160> NUMBER OF SEQ ID NOS: 1

<210> SEQ ID NO 1
<211> LENGTH: 467
<212> TYPE: PRT
<213> ORGANISM: Homo Sapiens
```

<400> SEQUENCE: 1

```
Leu Pro Ala Gln Val Ala Phe Thr Pro Tyr Ala Pro Glu Pro Gly Ser
1               5                   10                  15

Thr Cys Arg Leu Arg Glu Tyr Tyr Asp Gln Thr Ala Gln Met Cys Cys
            20                  25                  30

Ser Lys Cys Ser Pro Gly Gln His Ala Lys Val Phe Cys Thr Lys Thr
        35                  40                  45

Ser Asp Thr Val Cys Asp Ser Cys Glu Asp Ser Thr Tyr Thr Gln Leu
    50                  55                  60

Trp Asn Trp Val Pro Glu Cys Leu Ser Cys Gly Ser Arg Cys Ser Ser
65                  70                  75                  80

Asp Gln Val Glu Thr Gln Ala Cys Thr Arg Glu Gln Asn Arg Ile Cys
                85                  90                  95

Thr Cys Arg Pro Gly Trp Tyr Cys Ala Leu Ser Lys Gln Glu Gly Cys
            100                 105                 110

Arg Leu Cys Ala Pro Leu Arg Lys Cys Arg Pro Gly Phe Gly Val Ala
        115                 120                 125

Arg Pro Gly Thr Glu Thr Ser Asp Val Val Cys Lys Pro Cys Ala Pro
    130                 135                 140

Gly Thr Phe Ser Asn Thr Thr Ser Ser Thr Asp Ile Cys Arg Pro His
145                 150                 155                 160

Gln Ile Cys Asn Val Val Ala Ile Pro Gly Asn Ala Ser Met Asp Ala
                165                 170                 175

Val Cys Thr Ser Thr Ser Pro Thr Arg Ser Met Ala Pro Gly Ala Val
            180                 185                 190

His Leu Pro Gln Pro Val Ser Thr Arg Ser Gln His Thr Gln Pro Thr
        195                 200                 205

Pro Glu Pro Ser Thr Ala Pro Ser Thr Ser Phe Leu Leu Pro Met Gly
    210                 215                 220

Pro Ser Pro Pro Ala Glu Gly Ser Thr Gly Asp Glu Pro Lys Ser Cys
225                 230                 235                 240

Asp Lys Thr His Thr Cys Pro Pro Cys Pro Ala Pro Glu Leu Leu Gly
                245                 250                 255

Gly Pro Ser Val Phe Leu Phe Pro Pro Lys Pro Lys Asp Thr Leu Met
            260                 265                 270

Ile Ser Arg Thr Pro Glu Val Thr Cys Val Val Val Asp Val Ser His
        275                 280                 285

Glu Asp Pro Glu Val Lys Phe Asn Trp Tyr Val Asp Gly Val Glu Val
    290                 295                 300

His Asn Ala Lys Thr Lys Pro Arg Glu Glu Gln Tyr Asn Ser Thr Tyr
305                 310                 315                 320

Arg Val Val Ser Val Leu Thr Val Leu His Gln Asp Trp Leu Asn Gly
                325                 330                 335

Lys Glu Tyr Lys Cys Lys Val Ser Asn Lys Ala Leu Pro Ala Pro Ile
            340                 345                 350

Glu Lys Thr Ile Ser Lys Ala Lys Gly Gln Pro Arg Glu Pro Gln Val
        355                 360                 365

Tyr Thr Leu Pro Pro Ser Arg Glu Glu Met Thr Lys Asn Gln Val Ser
    370                 375                 380

Leu Thr Cys Leu Val Lys Gly Phe Tyr Pro Ser Asp Ile Ala Val Glu
385                 390                 395                 400

Trp Glu Ser Asn Gly Gln Pro Glu Asn Asn Tyr Lys Thr Thr Pro Pro
```

-continued

```
                405                 410                 415
Val Leu Asp Ser Asp Gly Ser Phe Phe Leu Tyr Ser Lys Leu Thr Val
            420                 425                 430

Asp Lys Ser Arg Trp Gln Gln Gly Asn Val Phe Ser Cys Ser Val Met
            435                 440                 445

His Glu Ala Leu His Asn His Tyr Thr Gln Lys Ser Leu Ser Leu Ser
        450                 455                 460

Pro Gly Lys
465
```

CELL CULTURE METHOD

CROSS-REFERENCE TO RELATED APPLICATION AND INCORPORATION BY REFERENCE OF MATERIAL SUBMITTED ELECTRONICALLY

This application claims the benefit of priority to U.S. Provisional Patent Application No. 63/129,349, filed Dec. 22, 2020, which is hereby incorporated by reference in its entirety.

Incorporated by reference in its entirety is a computer-readable nucleotide/amino acid sequence listing submitted concurrently herewith and identified as follows: ASCII (text) file named "55498_Seqlisting.txt", 4,255 bytes created Dec. 21, 2021.

FIELD OF THE INVENTION

The present disclosure is in the field of cell culture methods for producing therapeutic proteins.

BACKGROUND

Clinical manufacture of therapeutic proteins is an expensive, large scale endeavor. The production of recombinant polypeptides for use as pharmaceutical therapeutics typically utilizes a drug substance cell culture process that consists of a series of scale-up and expansion phases designed to generate sufficient cell mass for inoculation of a production bioreactor. The cell culture process is initiated by thawing a vial from the working cell bank (WCB) and expanding the culture by using, for example, a series of shake flasks, culture bags, and/or expansion seed bioreactors (e.g., N−3, N−2, wherein the number indicates how many steps antecedent a bioreactor is from N, the final, or production, bioreactor), or the like. Following growth in the seed culture bioreactors, the culture is transferred to an N−1 bioreactor, which can be, for example, a perfusion bioreactor. In an N−1 perfusion bioreactor, the culture is perfused with fresh medium in order to generate sufficient cell densities for inoculation of the final cultivation step, the production bioreactor (N). The production bioreactor is operated to maximize the efficient production of the recombinant polypeptide.

Most of the efforts to date to improve the efficient production of recombinant polypeptides have involved manipulating the N production bioreactor parameters. Methods and systems used in the scale-up and expansion phases remain complex, labor intensive, cumbersome, and present multiple challenges in expanding therapeutic protein production facilities. Yet, alternative methods and systems for scale-up and expansion phases have proven elusive because of adverse effects on cell titer and culture viability for N production runs, as well as inconsistency in the final therapeutic protein product. As the demand for greater quantities of therapeutic recombinant proteins increases, there is a need for alternative methods and systems for cell expansion and recombinant protein production which minimizes the disadvantages of current protocols.

SUMMARY

The disclosure provides a method of producing etanercept from Chinese hamster ovary cells (CHO). The method comprises running an N−1 bioreactor system using a recirculating tangential flow filtration (RTF) or alternating tangential flow filtration (ATF) cell retention device under conditions that maintain a cell aggregate size of at least about 20 μm (and, optionally, not greater than about 200 μm; e.g., between about 20 μm and about 150 μm or between about 20 μm and about 95 μm) before running an N production bioreactor. In various aspects, these conditions provide an η of at least about 20 μm (and, optionally, not greater than about 200 μm) using Formula 1:

$$\eta = \left(\frac{v^3}{\epsilon}\right)^{\frac{1}{4}}$$

wherein ε is [U³/L], L is the length of tubing connecting the bioreactor and RTF or ATF cell retention device, U is [flow rate in tubing/cross-sectional area of tubing], and v is [cell culture viscosity/cell culture density]. Optionally, the conditions include a flow rate through the tubing selected from about 4 mL/min/fiber to about 16 mL/min/fiber for hollow fiber modules, about 360 L/m²/hr to about 720 L/m²/hr for flat sheet filter modules, or about 1 L/m/channel to about 4 L/m/channel for stacked plate modules; a cell culture viscosity selected from about 1 to about 6 centipoise (e.g., about 2 to about 6 centipoise); and/or a cell culture density is selected from about 1 g/L to about 1.5 g/L.

The disclosure further provides a formulation of etanercept comprising etanercept produced using the method described herein. The formulation, in various aspects, comprises: 50 mg/mL of etanercept, 1% sucrose (w/v), 100 mM sodium chloride, 25 mM sodium phosphate, 25 mM L-arginine, and water; 25 mg of etanercept, 40 mg mannitol, 10 mg sucrose, and 1.2 mg tromethamine in a lyophilized powder; or 50 mg/mL of etanercept, 1% sucrose (w/v), 120 mM sodium chloride, 25 mL L-arginine, and water. The disclosure also provides a method of treating a patient in need thereof, the method comprising administering to the patient an effective dose of etanercept produced using the method of disclosure. In various aspects, the patient is suffering from rheumatoid arthritis, polyarticular juvenile idiopathic arthritis, psoriatic arthritis, ankylosing spondylitis, or plaque psoriasis. Use of etanercept produced as described herein to treat a patient in need thereof, and use of etanercept produced as described herein in the preparation of a medicament to treat a patient in need thereof, are contemplated. A kit comprising the formulation described herein and instructions for use of the formulation is provided.

It should be understood that, while various embodiments in the specification are presented using "comprising" language, under various circumstances, a related embodiment may also be described using "consisting of" or "consisting essentially of" language. The disclosure contemplates embodiments described as "comprising" a feature to include embodiments which "consist of" or "consist essentially of" the feature. The term "a" or "an" refers to one or more; the terms "a" (or "an"), "one or more," and "at least one" can be used interchangeably herein. The term "or" should be understood to encompass items in the alternative or together, unless context unambiguously requires otherwise. The term "and/or" should be understood to encompass each item in a list (individually), any combination of items a list, and all items in a list together.

It should also be understood that when describing a range of values, the disclosure contemplates individual values found within the range. For example, "cell aggregate size of between about 20 μm and about 200 μm," could be, but is not limited to, 40 μm, 60 μm, 100 μm, etc., and any value in between such values. In any of the ranges described herein, the endpoints of the range are included in the range. However, the description also contemplates the same ranges in which the lower and/or the higher endpoint is excluded.

Additional features and variations of the invention will be apparent to those skilled in the art from the entirety of this application, including the figures and detailed description, and all such features are intended as aspects of the invention. Likewise, features of the invention described herein can be re-combined into additional embodiments that also are intended as aspects of the invention, irrespective of whether the combination of features is specified as an aspect or embodiment of the invention. The entire document is intended to be related as a unified disclosure, and it should be understood that all combinations of features described herein (even if described in separate sections) are contemplated, even if the combination of features is not found together in the same sentence, or paragraph, or section of this document. Also, only such limitations which are described herein as critical to the invention should be viewed as such; variations of the invention lacking limitations which have not been described herein as critical are intended as aspects of the invention.

BRIEF DESCRIPTION OF THE FIGURES

FIG. 1 provides an amino acid sequence of etanercept. It is to be understood that minor modifications and deletions of this sequence (up to 10%) may be possible and can be used within the scope of the disclosure. The method and techniques of the present disclosure can be used to produce biosimilar etanercept that differs from ENBREL® in, for example, its sequence, glycosylation pattern, or other post-translational modification.

FIG. 2 is a graph illustrating data described in the Example. Final titer of etanercept (mg/L; y-axis) is provided for N-0 cultures inoculated from N-1 cultures performed under condition #1 (AML SSM 2019), condition #2 (ATF A2B=0.125), condition #3 (ATF A2B=0.25), and condition #4 (ATF A2B=0.375).

FIG. 3B is an illustration of a bioreactor operably connected to a recirculating tangential flow filtration (RTF) system comprising at least one filter module and a pump. Media is introduced into the bioreactor while the cell retention device pump flows cell culture through the filter module. Cell-free harvest, which typically comprises spent media, culture waste, recombinant protein, etc., is removed. Tubing connects the media source to the bioreactor, the bioreactor to the cell retention device, and cell retention device to harvest collection means (represented by arrows in schematic). The schematics of FIGS. 3A and 3B are provided merely to illustrate representative aspects of the disclosure; the system and method of the disclosure are not dependent on a particular arrangement of components of an N-1 bioreactor system.

DETAILED DESCRIPTION

Despite the many years of research and development devoted to therapeutic products, efficient production of recombinant proteins on an industrial scale remains a challenge. Improvements to manufacturing that increase productivity, improve consistency of product, reduce cost of starting materials or processing time, or reduce equipment costs would have substantial economic benefits. Each step of the manufacturing process has the potential to affect the final product delivered to the patient, however, and the ultimate effect of adjusting parameters of a production method can be unpredictable, particularly when scaling up to industrial-scale processes. Indeed, the system and method of producing a recombinant protein affects not only the amount of protein produced by cell culture, but also the protein composition itself with respect to, e.g., glycosylation patterns, in potentially unpredictable ways. Further, the conditions appropriate for production of one recombinant protein are not necessarily appropriate for efficient, consistent manufacture of a different recombinant protein. The disclosure provides a system and method for producing etanercept in Chinese hamster ovary (CHO) cells that maximizes recombinant protein production while producing a consistent therapeutic product, overcoming technical hurdles associated with industrial scale production of therapeutic proteins.

Etanercept (Enbrel®, Immunex Corporation) is a dimeric fusion polypeptide consisting of the extracellular ligand-binding portion of the human 75 kilodalton (p75) tumor necrosis factor receptor (TNFR) linked to the Fc portion of human IgG1 (see, e.g., U.S. Pat. No. 9,518,111). The Fc component of etanercept contains the constant heavy 2 (CH2) domain, the constant heavy 3 (CH3) domain and hinge region, but not the constant heavy 1 (CH1) domain of human IgG1. It consists of 934 amino acids and has an apparent molecular weight of approximately 150 kilodaltons (Physicians Desk Reference, 2002, Medical Economics Company Inc.). Etanercept contains both N- and O-linked oligosaccharides, which potentially influence the activity and immunogenicity of the therapeutic. The disclosure is based, at least in part, on the surprising discovery that maintenance of certain levels of CHO cell aggregation during N-1 production leads to increased titer during production phase.

The disclosure is directed to a method of producing etanercept from CHO cells. CHO cells are widely known and further described in, e.g., Brasel et al. (1996), Blood 88:2004-2012; Kaufman et al. (1988), J. Biol Chem 263: 6352-6362; McKinnon et al. (1991), J Mol Endocrinol 6:231-239; and Wood et al. (1990), J. Immunol. 145:3011-3016). The dihydrofolate reductase (DHFR)-deficient mutant cell lines (Urlaub et al. (1980), Proc Natl Acad Sci USA 77: 4216-4220), DXB11 and DG-44, are desirable CHO host cell lines because the efficient DHFR selectable and amplifiable gene expression system allows high level recombinant protein expression in these cells (Kaufman R. J. (1990), Meth Enzymol 185:537-566). In addition, these cells are easy to manipulate as adherent or suspension cultures and exhibit relatively good genetic stability. In preferred aspect of the disclosure, the cell culture is a suspension culture.

The method of the disclosure comprises running an N-1 bioreactor system using a recirculating tangential flow filtration (RTF) or alternating tangential flow filtration (ATF) cell retention device under conditions that maintain a cell aggregate size of at least about 20 μm and, optionally, not greater than about 200 μm, before running an N production bioreactor. This disclosure is the first to report that a cell aggregate size of at least about 20 μm (and optionally no greater than about 200 μm) supports N-1 production conditions that result in enhanced titer during the N production phase while maintaining desired product quality attributes. In various aspects, the cell aggregation size is between about 20 µm and about 150 µm (e.g., between about 40 µm and about 125 µm, between about 50 µm and about 100 µm, between about 20 µm and about 40 µm, between about 20 µm and about 60 µm, between about 20 µm and about 75 µm, between about 20 µm and about 80 µm, between about 20 µm and about 120 µm, or between about 20 µm and about 120 µm). In various aspects, the method is performed under conditions that maintain a cell aggregate size of between about 20 µm and about 95 µm. For example, in various aspects, the method is performed under conditions that maintain a cell aggregate size of at least about 20 µm, at least about 30 µm, at least about 40 µm, at least about 50 µm, at least about 60 µm, at least about 70 µm, at least about 80 µm, at least about 90 µm, at least about 100 µm, at least about 120 µm, at least about 140 µm, at least about 160 µm, or at least about 180 µm. Alternatively or in addition, the method is performed under conditions that maintain a cell aggregate size that is no greater than about 200 µm, no greater than about 190 µm, no greater than about 180 µm, no greater than about 170 µm, no greater than about 160 µm, no greater than about 150 µm, no greater than about 140 µm, no greater than about 130 µm, no greater than about 120 µm, no greater than about 110 µm, no greater than about 100 µm, no greater than about 90 µm, no greater than about 80 µm, no greater than about 70 µm, no greater than about 60 µm, no greater than about 50 µm, no greater than about 40 µm, or no greater than about 30 µm. The disclosure explicitly contemplates ranges within any of the endpoints described herein. Means of measuring the size of cell aggregates are known in the art. Automated cell counters, for example, are offered by Beckman Coulter (e.g., Vi-CELL), Roche (e.g., Cedex HiRes), and NOVA Biomedical (e.g., Bioprofile CDV), and may be used for cell counting, determining cell or aggregate size, and monitoring viability.

The term "bioreactor" means any vessel useful for the growth of a cell culture. A bioreactor can be of any size so long as it is useful for the culturing of cells; typically, a bioreactor is sized appropriate to the volume of cell culture being grown inside of it. Typically, a bioreactor will be at least 1 liter and may be 2, 5, 10, 50, 100, 200, 250, 500, 1,000, 1500, 2000, 2,500, or 5,000 liters or more, or any volume in between. A bioreactor may be 8,000, 10,000, 12,000, 18,000, 25,000 liters or more, or any volume in between. The internal conditions of the bioreactor, including, but not limited to, pH and temperature, can be controlled during the culturing period. Those of ordinary skill in the art will be aware of, and will be able to select, suitable bioreactors for use in practicing the method described herein.

By "running" a bioreactor system is meant maintaining conditions within the bioreactor system to support cell culture, i.e., the growth and propagation of cells outside of a multicellular organism or tissue. Suitable culture conditions for mammalian cells are known in the art. See e.g. Animal cell culture: A Practical Approach, D. Rickwood, ed., Oxford University Press, New York (1992). Mammalian cells may be cultured in suspension or while attached to a solid substrate. Fluidized bed bioreactors, hollow fiber bioreactors, roller bottles, shake flasks, or stirred tank bioreactors, with or without microcarriers, and operated in a batch, fed batch, continuous, semi-continuous, or perfusion mode are available for mammalian cell culture. A fed batch culture of mammalian cells is one in which the culture is fed, either continuously or periodically, with a concentrated feed medium containing nutrients. See e.g. Chu and Robinson (2001), Current Opin. Biotechnol. 12: 180-87. In perfusion-based systems, media is continuously fed into and removed from the culture. As media and unwanted products of the cell culture are removed (e.g., "cell-free harvest"), cells are retained via cell retention devices, e.g., tangential flow filtration (TFF) systems such as the alternating tangential flow (ATF) and the recirculating tangential flow filtration (RTF) systems. RTF relies on use of a recirculation means, most commonly a peristaltic pump, to move cell culture uni-directionally and parallel to a membrane surface to allow removal of spent media while retaining cells in the bioreactor. ATF systems are similar to those of RTF systems with the exception of a pump which moves cell culture back and forth through the module (e.g., through hollow-fiber filter modules), instead of flowing in only one direction. See e.g. U.S. Pat. No. 6,544,424; Furey (2002) Gen. Eng. News. 22 (7), 62-63. A benefit of ATF is a cleaning effect on the filter that is induced by the alternating flow. Optionally, the method of the disclosure comprises running an N-1 bioreactor using an ATF perfusion system.

Typically, hollow fiber filters are used in the RTF or ATF system (although this is not required). When the cell culture, including cell culture media, cells (whole and lysed), soluble expressed recombinant proteins, host cell proteins, waste products and the like, are introduced to the filter, depending on the pore size or molecular weight cutoff (MWCO), the hollow fiber material may retain certain cell culture components (in addition to the cells, themselves) on the lumen side (inside) and allow certain components to pass through the filter (permeate) based on the pore size or molecular weight cutoff of the hollow fiber material. The material that is retained (retentate) is returned to the bioreactor. Fresh perfusion cell culture media is added to the bioreactor and permeate is withdrawn from the filter at predetermined intervals or continuously to maintain a desired or constant bioreactor volume. The permeate (also termed "cell-free harvest") can be discarded, stored in holding tanks, bags or totes or transferred directly to another unit operation, such as filtration, flocculation, centrifugation and/or other downstream purification methods or the like. Fibers, in various aspects, have inner diameters of about 0.5 mm to about 1 mm, and may be of any suitable length (e.g., about 30 cm to about 110 cm). Hollow fibers for microfiltration typically have a pore size ranging from 0.1 µm to 10 µm or a molecular weight cut off of 500 kDa or more and can be used to allow the protein to pass through into the permeate. Ultrafiltration hollow fibers typically have a pore size range of 0.01 µm to 0.1 µm or a molecular weight cut off of 300 kDa or less, and can be used to retain the desired protein in the retentate and return it back to the bioreactor. This can be used, for example, to concentrate a recombinant protein product for harvest. Such filters are available commercially, such as Xampler UFP-750-E-4MA, Xampler UFP-30-E-4MA, (GE Healthcare, Pittsburgh, Pa.) and Midikros TC Modules T02-E030-10, T02-050-10, T02-E750-05, T02-M10U-06 (Spectrum Laboratories, Inc, Dominguez, Calif.).

Cell culture may be drawn out of the bioreactor and into the filter module by a pumping system, which passes the cell culture through or along a filter (e.g., through the lumen side of the hollow fiber). Examples of cell pumping systems include peristaltic pumps, double diaphragm pumps, low shear pumps (Levitronix™ pumps, Zurich, Switzerland), and alternating tangential flow systems (ATF™, Repligen, Waltham, MA). The permeate may be drawn from the filters by use of peristaltic pumps. Indeed, in a preferred embodiment, perfusion is accomplished by use of an alternating tangential flow system.

The method of the disclosure comprises running an N-1 bioreactor system using a RTF or an ATF cell retention device under conditions that maintain a cell aggregate size as disclosed above. Examples of conditions include the length of tubing connecting the bioreactor and the RTF or ATF cell retention device, the flow rate through the tubing connecting the bioreactor and the RTF or ATF cell retention device, the cross-sectional area of the tubing connecting the bioreactor and the RTF or ATF cell retention device, the cell culture viscosity, and/or the cell culture density. In various aspects of the disclosure, these conditions provide an r of at least about 20 µm (and, optionally, not greater than about 200 µm) using Formula 1:

$$\eta = \left(\frac{v^3}{\epsilon}\right)^{\frac{1}{4}} \quad \text{Formula 1}$$

Figure 1:
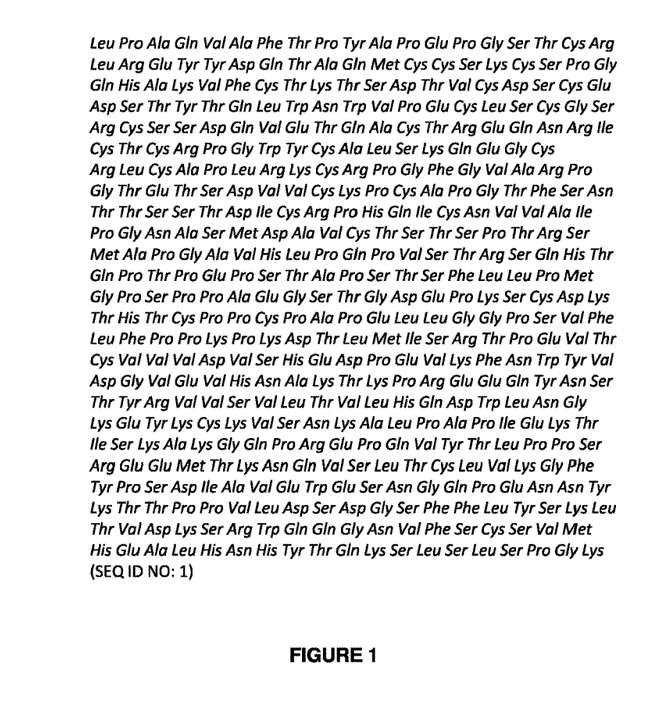
Figure 2:
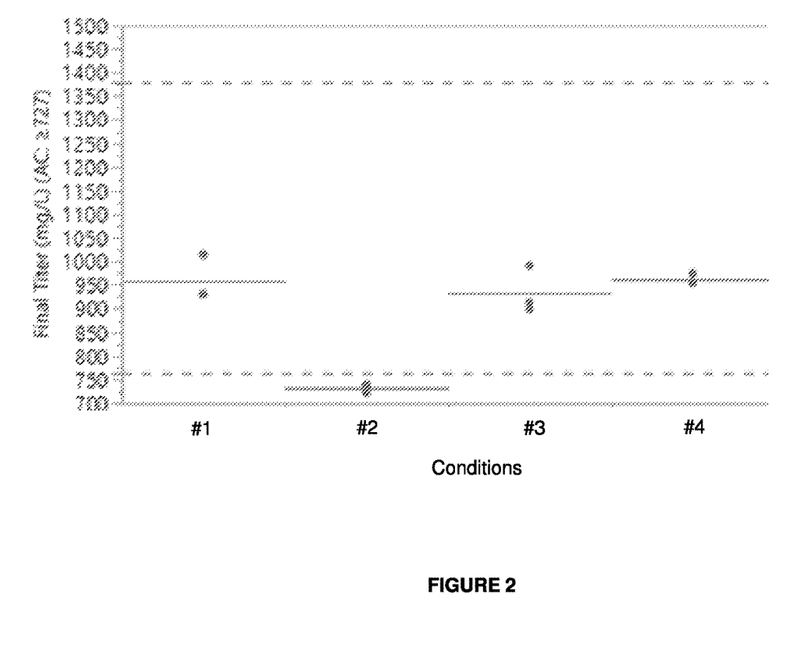
Figure 3A:
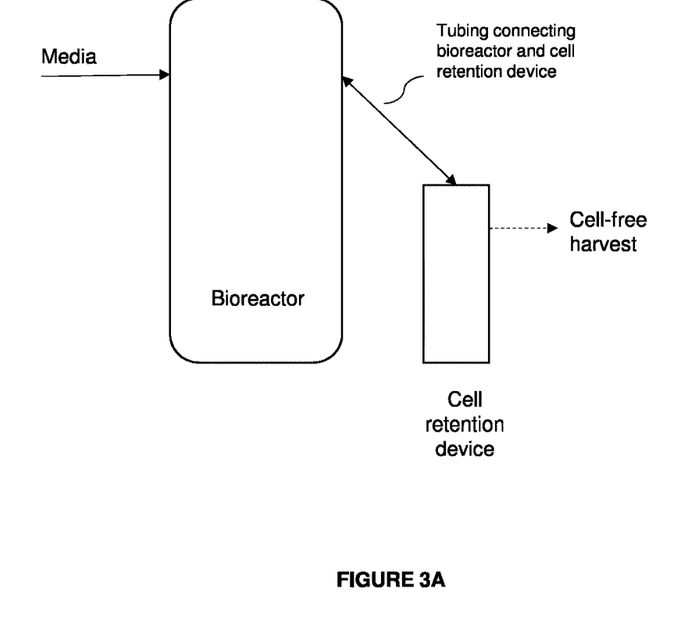
FIGS. 3A and 3B are schematics of a bioreactor system comprising a bioreactor operably coupled to a cell retention device. The cell retention device in the illustrative embodiment of FIG. 3A is an alternating tangential flow filtration (ATF) system comprising at least one filter module and a pump.
Figure 3B:
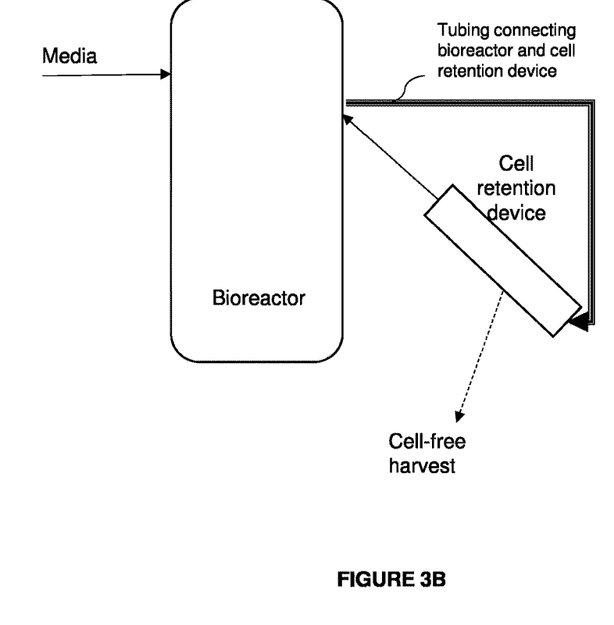

In Formula 1, ϵ is [U³/L]. L is the length of tubing connecting the bioreactor and RTF or ATF cell retention device; U is [flow rate in tubing connecting the bioreactor and RTF or ATF/cross-sectional area of tubing connecting the bioreactor and RTF or ATF]. In Formula 1, v is [cell culture viscosity/cell culture density]. In some instances, there is a single tube connecting the bioreactor and the cell retention device, and the length of that tubing from the port of the bioreactor to the port of the cell retention device is utilized (see, e.g., FIG. 3A for illustration). In other instances, there are multiple tubes connecting the bioreactor and the cell retention device (see, e.g., FIG. 3B for illustration); in these arrangements, the length of tubing utilized in Formula 1 is the longest segment of tubing in the circuit beginning at bioreactor exit port and ending at the bioreactor inlet port, not including the cell retention device. Merely to illustrate, in the schematic of FIG. 3B, the bolded line representing the tubing connecting the bioreactor and the inlet to the cell retention device would be used in Formula 1. It will be appreciated that adjustment of one or more of these parameters will affect the remaining parameters. In various aspects of the disclosure, the flow rate through the tubing is selected from (i) about 4 mL/min/fiber to about 16 mL/min/fiber for hollow fiber modules, (ii) about 360 L/m²/hr to about 720 L/m²/hr for flat sheet filter modules, or (iii) about 1 L/m/channel to about 4 L/m/channel for stacked plate modules (e.g., PROSTAK® modules sold by MilliporeSigma); the cell culture viscosity is selected from about 1 to about 6 centipoise (e.g., about 2 to about 6 centipoise); and/or the cell culture density is selected from about 1 g/L to about 1.5 g/L.

Cell culture medium is a media suitable for growth of animal cells, such as mammalian cells, in in vitro cell culture. Cell culture media formulations are well known in the art. Typically, cell culture media are comprised of buffers, salts, carbohydrates, amino acids, vitamins and trace essential elements. The cell culture medium may or may not contain serum, peptone, and/or proteins. Various tissue culture media, including serum-free and defined culture media, are commercially available, for example, any one or a combination of the following cell culture media can be used: RPMI-1640 Medium, RPMI-1641 Medium, Dulbecco's Modified Eagle's Medium (DMEM), Minimum Essential Medium Eagle, F-12K Medium, Ham's F12 Medium, Iscove's Modified Dulbecco's Medium, McCoy's 5A Medium, Leibovitz's L-15 Medium, and serum-free media such as EX-CELL™ 300 Series (JRH Biosciences, Lenexa, Kans.), among others. Cell culture media may be supplemented with additional or increased concentrations of components such as amino acids, salts, sugars, vitamins, hormones, growth factors, buffers, antibiotics, lipids, trace elements and the like, depending on the requirements of the cells to be cultured and/or the desired cell culture parameters.

Cell culture media may be serum-free, protein-free, and/or peptone-free. "Serum-free" applies to a cell culture medium that does not contain animal sera, such as fetal bovine serum. "Protein-free" applies to cell culture media free from exogenously added protein, such as transferrin, protein growth factors IGF-1, or insulin. Protein-free media may or may not contain peptones. "Peptone-free" applies to cell culture media which contains no exogenous protein hydrolysates such as animal and/or plant protein hydrolysates. Eliminating serum and/or hydrolysates from cell culture media has the advantage of reducing lot to lot variability and enhancing processing steps, such as filtration. However, when serum and/or peptone are removed from the cell culture media, cell growth, viability and/or protein expression may be diminished or less than optimal. As such, serum-free and/or peptone-free cell culture medium may be highly enriched for amino acids, trace elements and the like. See, for example, U.S. Pat. Nos. 5,122,469 and 5,633,162.

Defined cell culture media formulations are complex, containing amino acids, inorganic salts, carbohydrates, lipids, vitamins, buffers and trace essential elements. Identifying the components that are necessary and beneficial to maintain a cell culture with desired characteristics is an on-going task. Defined basal media formulations which are supplemented or enriched to meet the needs of a particular host cell or to meet desired performance parameters is one approach to developing defined media.

The cell culture viscosity, including components of the media and cells themselves, is optionally between about 1 to about 6 centipoise (e.g., about 2 to about 6 centipoise). Cell culture viscosity may be characterized using any suitable viscometer, such as a "cone-and-plate" viscometer. The cell culture density, including components of the media and cells themselves, is optionally selected from about 1 g/L to about 1.5 g/L. Cell culture density may be characterized by, e.g., using an automated cell counter, such as the Roche Cedex HiRes, which uses a Trypan Blue Exclusion method.

The method of the present disclosure may be used as part of a larger production process whereby cells are cultured in two or more distinct phases. For example, cells may be cultured in one or more growth phases prior to the N−1 production phase, cultured in the N−1 production phase, then transferred to a (N) production phase under conditions that maximize protein production. Each phase can be conducted in its own bioreactor vessel or other vessel suitable for cell culture. More than one phase can be conducted in a common vessel. In one such example, a growth phase and a production phase are conducted in the same bioreactor vessel. In a commercial process for production of a protein by mammalian cells, there are commonly multiple, for example, at least about 2, 3, 4, 5, 6, 7, 8, 9, or 10 growth phases that occur in different culture vessels preceding a final production phase. The method of the disclosure can be employed at least during the N−1 growth phase, although it may also be employed in a preceding growth phase (e.g., N−2 or N−3).

Mammalian cells, such as CHO cells, may be cultured in small scale cultures, such as for example, in 100 ml containers having about 30 ml of media, 250 ml containers having about 80 to about 90 ml of media, or 250 ml containers having about 150 to about 200 ml of media. Alternatively, the cultures can be large scale such as, for example, 1000 ml containers having about 300 to about 1000 ml of media, 3000 ml containers having about 500 ml to about 3000 ml of media, 8000 ml containers having about 2000 ml to about 8000 ml of media, and 15000 ml containers having about 4000 ml to about 15000 ml of media. Large scale cell cultures, such as for clinical manufacturing of protein therapeutics, are typically maintained for days, or even weeks, while the cells produce the desired protein(s). During this time the culture can be supplemented with a concentrated feed medium containing components, such as nutrients and amino acids, which are consumed during the course of the production phase of the cell culture. Concentrated feed medium may be based on just about any cell culture media formulation. Such a concentrated feed medium can contain most of the components of the cell culture medium at, for example, about 2×, 3×, 4×, 5×, 6×, 7×, 8×, 9×, 10×, 12×, 14×, 16×, 20×, 30×, or 50× of their normal amount. Concentrated feed media are often used in fed batch culture processes.

A production phase can be conducted at large scale. A large scale process can be conducted in a volume of at least about 100, 500, 1000, 2000, 3000, 5000, 7000, 8000, 10,000, 15,000, or 20,000 liters. A growth phase may occur at a higher temperature than a production phase. For example, a growth phase may occur at a first temperature from about 35° C. to about 38° C., and a production phase may occur at a second temperature from about 29° C. to about 37° C., optionally from about 30° C. to about 360° C. or from about 300° C. to about 340° C. In addition, chemical inducers of protein production, such as, for example, caffeine, butyrate, and hexamethylene bisacetamide (HMBA), may be added at the same time as, before, and/or after a temperature shift. If inducers are added after a temperature shift, they can be added from one hour to five days after the temperature shift, optionally from one to two days after the temperature shift.

The duration of the growth stage of production (N−1 stage) can range from, e.g., 7 to 14 days, and can be designed so as to maintain cells in exponential growth prior to inoculation of the production (N) bioreactor.

Samples from the cell culture can be monitored and evaluated using any analytical technique, such as analytical techniques known in the art. A variety of parameters including etanercept quality, medium quality, and other characteristics can be monitored for the duration of the culture. Samples can be taken and monitored intermittently at a desirable frequency, including continuous monitoring, real time or near real time. Samples may be taken during the N−1 (or preceding) phase, during the production (N) phase, or during purification processes, to quantitatively and/or qualitatively monitor characteristics of the protein product and the production process. Detection of product quality attributes may be achieved using mass spectrometry, liquid chromatography with UV and/or mass spectrometry detection, capillary electrophoresis, and the like. Post-translational modifications such as amino acid processing and glycosylation may be characterized using, for example, a polyhydroxyethyl aspartamide column operated in size-exclusion mode and coupled with ESI-MS (Brady et al., (2008) J Am Soc Mass Spectro, 19: 502-509). Real-time monitoring of eluate from ion exchange chromatography may be performed by monitoring a normalized LS/UV ratio for each fraction using laser light scattering detector and an UV absorbance (see, e.g., U.S. Patent Publication No. US 20130303732).

The methods, techniques, and compositions of the present disclosure can be used in combination with other methods, techniques, and compositions for producing recombinant protein products, in particular for producing etanercept. Examples of such other methods, techniques, and compositions are found in U.S. Pat. Nos. 7,915,225; 8,119,605; 8,410,060; 8,722,631; 7,648,702; 8,119,604; 8,828,947; 7,294,481; 7,476,722; 7,122,641; 6,872,549; 7,452,695; 7,300,773; 8,063,182; 8,163,522; 6,924,124; 7,645,609; 6,890,736; 7,067,279; 7,384,765; 7,829,309; 6,974,681; 6,309,841; 7,834,162; 8,217,153; 8,273,707; 7,781,395; 7,427,659; 7,157,557; 7,544,784; 7,083,948; 7,723,490; 8,053,236; 7,888,101; 8,247,210; 8,460,896; 8,680,248; 6,413,744; 7,091,004; 6,897,040; 6,632,637; 7,956,160; and 7,276,477, each of which is incorporated by reference in its entirety for all that it teaches or discloses.

The disclosure further provides a formulation comprising etanercept produced using the method described herein. The formulation may be a liquid formulation or a lyophilized formulation. Typically, the etanercept concentration in the formulation is between about 40 mg/mL and about 200 mg/mL in an aqueous formulation (e.g., water as the solvent). More preferably, the etanercept concentration is between about 40 mg/mL and about 100 mg/mL, yet more preferably between about 40 mg/mL and about 75 mg/mL, and optionally about 50 mg/mL. Excipients appropriate for use in the formulation include, but are not limited to, sugars/polyols, such as sucrose, lactose, glycerol, xylitol, sorbitol, mannitol, maltose, inositol, trehalose, and glucose; polymers, such as serum albumin (bovine serum albumin (BSA), human SA or recombinant HA), dextran, PVA, hydroxypropyl methylcellulose (HPMC), polyethyleneimine, gelatin, polyvinylpyrrolidone (PVP), or hydroxyethylcellulose (HEC); non-aqueous solvents, such as polyhydric alcohols, (e.g., PEG, ethylene glycol and glycerol), dimethysulfoxide (DMSO) and dimethylformamide (DMF); amino acids, such as, L-arginine, proline, L-serine, alanine, glycine, lysine hydrochloride, sarcosine and gamma-aminobutyric acid; surfactants, such as polysorbate 20, polysorbate 40, polysorbate 60, and polysorbate 80; and salts, such as sodium chloride, potassium chloride and sodium citrate;

In various aspects, the formulation comprises (or consists of) 50 mg/mL of etanercept, 1% sucrose (w/v), 100 mM sodium chloride, 25 mM sodium phosphate, 25 mM L-arginine, and water. Alternatively, the formulation comprises (or consists of) 25 mg of etanercept, 40 mg mannitol, 10 mg sucrose, and 1.2 mg tromethamine in a lyophilized powder. Alternatively, the formulation comprises (or consists of) 50 mg/mL of etanercept, 1% sucrose (w/v), 120 mM sodium chloride, 25 mL L-arginine, and water.

Optionally, the formulation is present in a delivery device, or a container for storage or shipment. For example, in various embodiments of the disclosure, about one mL or about 0.51 mL of the formulation is in a prefilled syringe or autoinjector (e.g., SURECLICK® autoinjector). Where the formulation is lyophilized powder, the formulation is optionally in a multiple-use vial. The disclosure further provides a kit comprising the formulation described herein with instructions for use of the formulation. The kit may comprise a container, for example, a single-use container (i.e., a container that holds one dose formulation). It is understood that a single-use container might contain a single dose plus enough extra to ensure that a full single dose can be administered to a patient from the container, but not so much extra that the container could be used to administer a second dose. Examples of containers (whether they be single-use or multiple-use containers) include vials, syringes, and auto-injectors. Examples of suitable auto-injectors include those found in U.S. Pat. Nos. 8,177,749, 8,052,645, and 8,920, 374, and in International Patent Publications Nos. WO 2014/0089393, WO 2016/033496, and WO 2016/033507, each of which is incorporated herein by reference in its entirety.

The etanercept-containing compositions and formulations described herein, as well as the syringes, autoinjectors, kits, and the like described herein, can be used in a method of treating a patient in need thereof, i.e., with a condition that responds to treatment with etanercept. The term "patient in need thereof" includes subjects already afflicted with the disorder, as well as those in which the disorder is to be prevented. The "patient" includes human and other mammalian subjects that receive either prophylactic or therapeutic treatment. The term "treatment" refers to both therapeutic treatment and prophylactic or preventative measures. "Treatment" does not require complete remission or eradication of the disease; any improvement in the disease and/or improvement in the symptoms associated with the disease are contemplated. Examples of conditions that respond to treatment with etanercept include rheumatoid arthritis, polyarticular juvenile idiopathic arthritis, psoriatic arthritis, ankylosing spondylitis, and psoriasis (i.e., plaque psoriasis). Methods of treating patients with etanercept are described in, for example, U.S. Pat. Nos. 7,915,225; 8,119,605; 8,410,060; 8,722,631; and 8,119,604, each of which is incorporated herein by reference in its entirety and in particular with respect to descriptions of the conditions described above and administration regimens.

The invention is further described in the following example. The example serves only to illustrate the invention and is not intended to limit the scope of the invention in any way.

Example

While effective for recombinant protein production, RTF can be labor intensive, require complex equipment, and present production challenges. A study was conducted to examine the use of ATF during the N-1 production phase to recombinantly produce etanercept in CHO cells. Initial studies wherein RTF was replaced with ATF in the N-1 production phase reduced the amount of etanercept ultimately produced by the culture (after N production phase). Surprisingly, it was determined that the level of CHO cell aggregation in the N-1 production phase affected product titer in N phase production.

N-1 perfusion reactors were run using two types of perfusion methods: Recirculating Tangential Flow Filtration (RTF) and Alternating Flow Filtration (ATF). Two types of cell retention devices were used: Sartorious Sartocon Slice Cassette with a 0.2 µm pore size for RTF perfusion and a GE Healthcare 0.45 µm pore size hollow fiber membrane for ATF perfusion. The N-1 reactor working volume was 2 L. Three different ATF transfer line inner diameters were tested (0.375", 0.25" & 0.125"). The systems used the same tubing length connecting the bioreactor and the cell retention device, flow rate within the tubing, cell culture viscosity, and cell culture density; the only variable for conditions #2, #3, and #4 was the cross-sectional area of the tubing (inner diameter). Formula 1 was applied to the system parameters to determine r for conditions #2 and #3. Conditions 1 and 4 did not produce sufficient turbulence to affect cell aggregation. The experimental conditions are summarized in Table 1.

| Condition # | Perfusion system | $\eta$ as determined by Formula I |
| --- | --- | --- |
| 1 | RTF | N/A (control) |
| 2 | ATF using A2B tubing with an inner diameter of 0.125" | 17 µm |
| 3 | ATF using A2B tubing with an inner diameter of 0.25" | 47 µm |
| 4 | ATF using A2B tubing with an inner diameter of 0.375" | N/A |

N-0 reactors with a 1 L working volume were inoculated using inoculum sources from each N-1 condition tested and were run using standard operating parameters. The design allowed assessment of the potential effects of the cell aggregate rate on the N-0 reactor performance and productivity.

The N-1 perfusion reactors run using conditions #1-#4 met all desired cell growth culture performance parameters, supporting cell viability of 95% or more over the entire course of the study (five days). N-0 cultures inoculated from the N-1 perfusion reactors also demonstrated normal cell viability. Surprisingly, however, N-0 cultures inoculated from the N-1 culture using condition #2 resulted in significantly lower titer compared to cultures inoculated from N-1 cultures performed using condition #1, #3, and #4. While not wishing to be bound by any theory, perfusion parameters of condition #2, resulting in $\eta$=17 µm, were associated with detrimental hydrodynamic conditions which promoted the breakage of cell aggregates in the N-1 stage. Disruption of cell aggregates in the N-1 stage unexpectedly resulted in poor N-0 culture performance. Adjusting the parameters to increase the value of r increased the N-1 culture aggregate rate, which surprisingly resulted in enhanced titer in N-0 cultures. $\eta$ values of 20 µm or more correspond to sufficiently large eddies in the perfusion flow to maintain a level of cell aggregation that results in higher titer while maintaining consistent product quality attributes. Indeed, N-0 cultures taken for N-1 cultures from condition #3 and #4 were comparable to N-1 cultures using RTF in terms of culture performance, titer, main peak, and aggregates.

All of the references cited herein, including patents, patent applications, literature publications, and the like, are hereby incorporated in their entireties by reference.

While this invention has been described with an emphasis upon preferred embodiments, it will be obvious to those of ordinary skill in the art that variations of the preferred compounds and methods may be used and that it is intended that the invention may be practiced otherwise than as specifically described herein. Accordingly, this invention includes all modifications encompassed within the spirit and scope of the invention as defined by the following claims.

What is claimed is:

1. A method of producing etanercept from Chinese hamster ovary cells (CHO), the method comprising running an N−1 bioreactor system using a recirculating tangential flow filtration (RTF) or an alternating tangential flow filtration (ATF) cell retention device under conditions that maintain a cell aggregate size of at least 20 µm, wherein the system utilizes a tubing length, tubing cross-sectional area, and flow rate which provides an n of at least 20 µm using Formula 1:

$$\eta = \left(\frac{v^3}{\epsilon}\right)^{\frac{1}{4}}.$$

2. The method of claim 1, wherein the method is performed under conditions that maintain a cell aggregate size of no more than 200 µm.

3. The method of claim 1, wherein the method is performed under conditions that maintain a cell aggregate size of between 20 µm and 150 µm.

4. The method of claim 3, wherein the method is performed under conditions that maintain a cell aggregate size of between 20 µm and 95 µm.

5. The method of claim 1, wherein η is no greater than 200 µm using Formula 1.

6. The method of claim 1, wherein the flow rate is selected from (i) about 4 mL/min/fiber to about 16 mL/min/fiber for a hollow fiber module, (ii) about 360 L/m²/hr to about 720 L/m²/hr for flat sheet filter modules, and (iii) about 1 L/m/channel to about 4 L/m/channel for stacked plate modules; the cell culture viscosity is selected from about 1 to about 6 centipoise; and the cell culture density is selected from about 1 g/L to about 1.5 g/L.

7. The method of claim 1, further comprising preparing a formulation comprising etanercept produced using the method of claim 1.

8. The method of claim 7, wherein the formulation consists of 50 mg/ml of etanercept, 1% sucrose (w/v), 100 mM sodium chloride, 25 mM sodium phosphate, 25 mM L-arginine, and water.

9. The method of claim 7, wherein the method further comprises filling the formulation comprising etanercept into a multiple-use vial and lyophilizing the formulation, wherein the lyophilized formulation consists of 25 mg of etanercept, 40 mg mannitol, 10 mg sucrose, and 1.2 mg tromethamine.

10. The method of claim 7, wherein the formulation consists of 50 mg/mL of etanercept, 1% sucrose (w/v), 120 mM sodium chloride, 25 mL L-arginine, and water.

11. The method of claim 7, wherein the method further comprises filling 1 mL of said formulation in a syringe or SURECLICK® autoinjector.

12. The method of claim 7, wherein the method further comprises filling 0.51 mL of said formulation in a prefilled syringe or SURECLICK® autoinjector.

13. The method of claim 1, wherein the system utilizes a tubing length, tubing cross-sectional area, and flow rate which provides an n of 20 µm using Formula 1.

* * * * *